US011476558B2

(12) United States Patent
Tsorng et al.

(10) Patent No.: US 11,476,558 B2
(45) Date of Patent: Oct. 18, 2022

(54) FLEXIBLE POLE MOUNT

(71) Applicant: Quanta Computer Inc., Taoyuan (TW)

(72) Inventors: Yaw-Tzorng Tsorng, Taoyuan (TW);
Ming-Lung Wang, Taoyuan (TW);
Jia-Lin Liu, Taoyuan (TW)

(73) Assignee: QUANTA COMPUTER INC.,
Taoyaun (TW)

( * ) Notice: Subject to any disclaimer, the term of this patent is extended or adjusted under 35 U.S.C. 154(b) by 51 days.

(21) Appl. No.: 17/191,885

(22) Filed: Mar. 4, 2021

(65) Prior Publication Data

US 2022/0115762 A1 Apr. 14, 2022

Related U.S. Application Data

(60) Provisional application No. 63/089,218, filed on Oct. 8, 2020.

(51) Int. Cl.
*E04G 3/00* (2006.01)
*H01Q 1/12* (2006.01)
*F16M 13/02* (2006.01)

(52) U.S. Cl.
CPC ........ *H01Q 1/1228* (2013.01); *F16M 13/022* (2013.01); *F16M 2200/024* (2013.01)

(58) Field of Classification Search
CPC ............... H01Q 1/1228; F16M 13/022; F16M 2200/024; F16B 2/065
USPC ............... 248/274.1, 230.1, 230.8; 47/42, 43
See application file for complete search history.

(56) References Cited

U.S. PATENT DOCUMENTS

| 6,508,446 | B1 * | 1/2003 | Addison | A47D 13/105 |
| | | | | 182/187 |
| 8,763,755 | B2 * | 7/2014 | Hagberg | E04G 5/067 |
| | | | | 182/187 |
| 9,204,628 | B2 * | 12/2015 | Priest | A01M 31/02 |
| 11,105,461 | B2 * | 8/2021 | Deng | H01Q 1/1228 |
| 2013/0001385 | A1 * | 1/2013 | Green | A01K 87/00 |
| | | | | 248/218.4 |
| 2022/0112910 | A1 * | 4/2022 | Tsorng | H01Q 1/246 |
| 2022/0115773 | A1 * | 4/2022 | Urtz | H01Q 1/246 |

* cited by examiner

*Primary Examiner* — Todd M Epps
(74) *Attorney, Agent, or Firm* — Nixon Peabody LLP

(57) ABSTRACT

A flexible mount for attaching an object to poles of different diameters is disclosed. The flexible mount includes a series of two or more supports configured to securely hold a pole. Each support includes a bracket, a first bearing, a second bearing, and a tensioner. The bracket includes a first end, a second end, and a mount for mounting an object radially relative to the longitudinal axis of the pole. The first bearing is pivotally coupled to the first end of the bracket. The second bearing is pivotally coupled to the second end of the bracket. The tensioner includes a first end coupled to the second bearing, and a second end coupled to a sequential support in the series.

17 Claims, 8 Drawing Sheets

FLEXIBLE POLE MOUNT

PRIORITY CLAIM

This application claims priority under 35 U.S.C. § 119 to U.S. Provisional Application No. 63/089,218, entitled "FLEXIBLE POLE MOUNT KIT FOR VARIOUS POLE DIAMETER," and filed on Oct. 8, 2020. The contents of that application are hereby incorporated by reference in their entirety.

TECHNICAL FIELD

The present disclosure relates generally to flexible pole mounts that support an object and may be coupled to poles having different diameters. More particularly, aspects of this disclosure relate to flexible pole mounts for mounting communication equipment to poles.

BACKGROUND

Tall support structures for mounting communications equipment have been ubiquitous since the introduction of radio antenna networks. As point-to-point and mobile communication has grown, so has the number of required support structures. The recent advent of 5G communication has driven the implementation of communications equipment such as Active Antenna Units (AAU), Antenna-Integrated Radios (AIR), Remote Radio Heads (RRH), Remote Radio Units (RRU), Distributed Unit (DU), and Centralized Unit (CU).

Mounting communications equipment to support structures requires a mounting device. The mounting device should accommodate different diameter support structures, have low weight, be easy to install and should be sturdy enough for different communications equipment to be installed. The present disclosure is directed at least in part to providing such mounting devices.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

A first implementation of the disclosure is a flexible mount. The flexible mount includes a series of two or more supports configured to securely hold a pole. Each support includes a bracket, a first bearing, a second bearing, and a tensioner. The bracket includes a first end, a second end, and a base for mounting an object radially relative to a longitudinal axis of the pole. The first bearing is pivotally coupled to the first end of the bracket. The second bearing is pivotally coupled to the second end of the bracket. The tensioner includes a first end coupled to the second bearing, and a second end coupled to a sequential support in the series. Optionally, the bracket includes a top lateral arm, a bottom lateral arm, and a central plate. The central plate includes the base and extends between the lateral arms. The first bearing pivots between the top and bottom lateral arms at the first end. The second bearing pivots between the top and bottom lateral arms at the second end.

Optionally, the flexible mount further includes a first pin, a first hole passing through a first end of the top lateral arm, and a second hole passing into the first bearing. The first pin is positioned in the first hole and the second hole. The first pin, the first hole, and the second hole are aligned along a first axis that is parallel to the longitudinal axis. Optionally, the flexible mount also further includes, a third hole passing through a second end of the top lateral arm, and a fourth hole passing into the second bearing. The second pin is positioned in the third hole and fourth hole. The second pin, the third hole, and the fourth hole are aligned along a second axis that is parallel to the longitudinal axis.

Optionally, the flexible mount further includes a third pin, a fifth hole passing through a first end of the bottom lateral arm, and a sixth hole passing into the first bearing. The third pin is positioned in the fifth hole and the sixth hole. The third pin, the fifth hole, and the sixth hole are aligned along the first axis. Optionally, the flexible mount further includes a fourth pin, a seventh hole passing through a second end of the bottom lateral arm, and an eighth hole passing into the second bearing. The fourth pin is positioned in the seventh hole and the eighth hole. The fourth pin, the seventh hole, and the eighth hole are aligned along the second axis.

In some implementations, the first end of the tensioner is removably coupled to the second bearing. Optionally, the second end of the tensioner is removably coupled to the sequential support in the series. Optionally, the first bearing and the second bearing each include a bearing hole. The first end of the tensioner is inserted in the bearing hole of the second bearing. The second end of the tensioner is inserted into the bearing hole of the first bearing of the sequential support.

According to some implementations, the tensioner includes a first adjustable stop on the first end, and the tensioner includes a second adjustable stop on the second end. The first adjustable stop and the second adjustable stop are adjustable to a plurality of positions along a length of the tensioner. The adjustment increases or decreases the distance between a support and the sequential support in the series. Optionally, the first adjustable stop is a first nut, and the second adjustable stop is a second nut. The first end of the tensioner is threaded to accept the first nut, and the second end of the tensioner is threaded to accept the second nut.

In some implementations, the base includes a fastener for mounting the object. For example, the fastener can include one or more of a bolt, a nut, a screw, a pin, a clamp, a rail, a groove, a hook, a loop, a cable, a rope or a combination thereof. Optionally, the flexible mount further includes, attached to the base, an Active Antenna Unit (AAU), an Antenna-Integrated Radio (AIR), a Remote Radio Head (RRH), a Remote Radio Unit (RRU), a Distributed Unit (DU), or a Centralized Unit (CU).

Another implementation of the disclosure is a kit for a flexible mount. The kit includes a bracket having a base, a first bearing including a first bearing hole, a second bearing including a second bearing hole, and a tensioner. The first bearing is pivotally coupled to a first end of the bracket, and the second bearing is pivotally coupled to a second end of the bracket. The tensioner includes a diameter matching the first bearing hole and the second bearing hole. The tensioner includes a stop that is adjustable to a plurality of positions along a tensioner length. Optionally, the kit further comprises a case for holding the bracket and the tensioner. Optionally, the kit further comprises a tool configured to adjust and position the stop to the plurality of positions along the tensioner length. Optionally, the kit further includes one or more additional brackets and one or more additional tensioners. Optionally, a first end of the tensioner is coupled to the second bearing of the bracket, the tensioner and bracket forming a support for an object.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
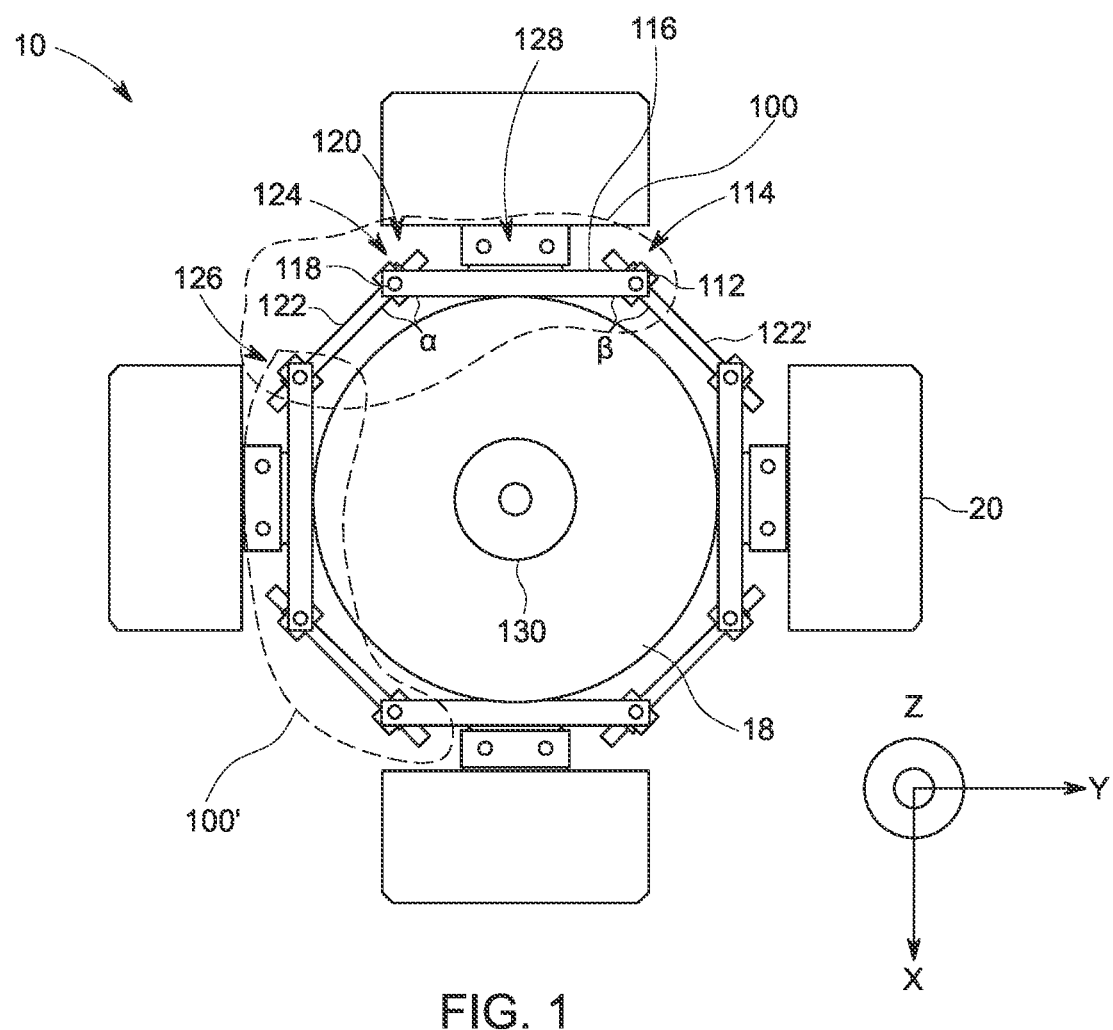
FIG. 1 is a top view of a flexible mount securely holding a pole, according to some implementations.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed to a flexible mount that can support objects having different form factors. The flexible mount has a modular design, making it adjustable and easy to install on poles having different diameters. The modular design also makes the components of the flexible mount easy to include in a kit, where the components can be easily transported in and replenished as they are used. The flexible mount is suitable, inter alia, for mounting communications equipment to communication towers having masts and poles for attachment thereto.

FIG. 1 depicts a flexible mount 10 securely holding a pole 18, according to some implementations. Coordinates (X, Y, and Z) are indicated, where the view is a top view looking down in the negative Z direction. The longitudinal axis 130 of pole 18 is parallel to the Z coordinate. The pole 18 is shown in cross section for clarity. The flexible mount 10 includes a series of two or more supports 100 that are configured to securely hold the pole 18. The number of supports 100 to be used is determined by the diameter of the pole 18 to which the flexible mount 10 is attached. Although the pole 18 is shown as cylindrical in FIG. 1, in some implementations, the pole 18 can have other cross-sectional shapes. For example, the cross section can be an n-sided polygon, such as a triangle (n=3), a square (n=4), a pentagon (n=5), a hexagon (n=6), etc. The pole 18 can also have other cross-sectional shapes such as an H-Beam structure or an I-Beam structure. In some implementations, the pole 18 is flexible such as a cable or have a flat sheet-like shape, provided the pole 18 can support the flexible mount 10 and the object 20. For example, a cable or a flat sheet-like shape that is stretched and supported on opposite ends, can be used to attach the flexible mount 10 between two ends of the flexible pole 18. In some implementations, the pole 18 is a straight pole. In some other implementations, the pole 18 is not a straight pole. For example, the pole 18 can be curved.

In some implementations, the pole 18 can be of any height and diameter. In some implementations, the height and diameter are constrained by commercial availability. Without limitation, this can include pole dimensions as described in the article by S. Kalaga et al., *Buckling Analysis of Guyed Laminated Wood Transmission Poles*. Civil Eng Res J. 2019; 8(2). In some implementations, the pole 18 has a length between about 10 feet and about 100 feet. In some implementations, the diameter of the pole 18 is between about 6 inches and about 20 inches. In some implementations, the diameter of the pole 18 varies along its length. For example, in some implementations, the pole 18 is wider at its base than at other positions along its length.

The flexible mount 10 can be made of any structural material. For example, the structure material can include metals, plastics, fibers, glasses, carbon, wood, concrete, or combinations of these. In some implementations, the structural material is a stainless steel rated for outdoor use. In some implementations, the flexible mount includes a protective coating such as a paint, an anti-rust treatment or a hydrophobic material.

The support 100 includes a bracket 116 having a first end 114 and a second end 120. The bracket 116 also includes a base 128 for mounting an object radially relative to a longitudinal axis 130 of the pole 18. The bracket 116 further includes a first bearing 112 that is pivotally coupled to the first end 114 of the bracket 116, and a second bearing 118 that is pivotally coupled to the second end 120 of the bracket 116. The support 100 also includes a tensioner 122. The tensioner 122 includes a first end 124 that is coupled to the second bearing 118. The tensioner 122 also includes a second end 126 that is coupled to the sequential support 100' in the series of supports.

The pivotal coupling of the first bearing 112 and the second bearing 118 allows the bracket 116 to rotate or pivot relative to the bearings 112,118. Accordingly, an angle α can be accommodated between the bracket 116 and the tensioner 122, and a different angle β can be accommodated between the bracket 116 and tensioner 122'. In some implementations, the angle α is equal to the angle β. In some other implementations, the angle α is not equal to the angle β. Although only two angles are indicated in FIG. 1, the number of angles depends on the number of supports 100 used for the flexible mount 10. For example, there are 8 angles, two per support 100, in the configuration shown in FIG. 1. Each of these angles can be the same or different.

The pivotal coupling from the bearings 112 and 118 reduces stress experienced by the bracket 116 and the tensioner 122, as the flexible mount 10 is secured to the pole 18. The stress can be further exacerbated when the flexible mount 10 supports an object 20. For example, without a pivotal coupling, the bracket 116 and the tensioner 122 would need to bend, buckle, and potentially be permanently damaged when attempting to mount the flexible mount 10 to securely hold the pole 18.

The flexible mount 10 can also be described as a chain or catenated structure, where each support 100 is a link in the chain. The possible annular diameter of the assembled structure of supports 100 can be adjusted in part by including more, or fewer supports 100 or chain links. However, as will be described in more detail below, the tensioner 122', coupled to the first bearing 112, and the tensioner 122 coupled to the second bearing 118, also provides a finer adjustment for attachment to poles with various diameters. Furthermore, the pivotal attachment of the first bearing 112 and the second bearing 118 to the bracket 116 provides flexibility in attachment to various diameters and cross-sectional shapes of poles, as described above.

Figure 2:
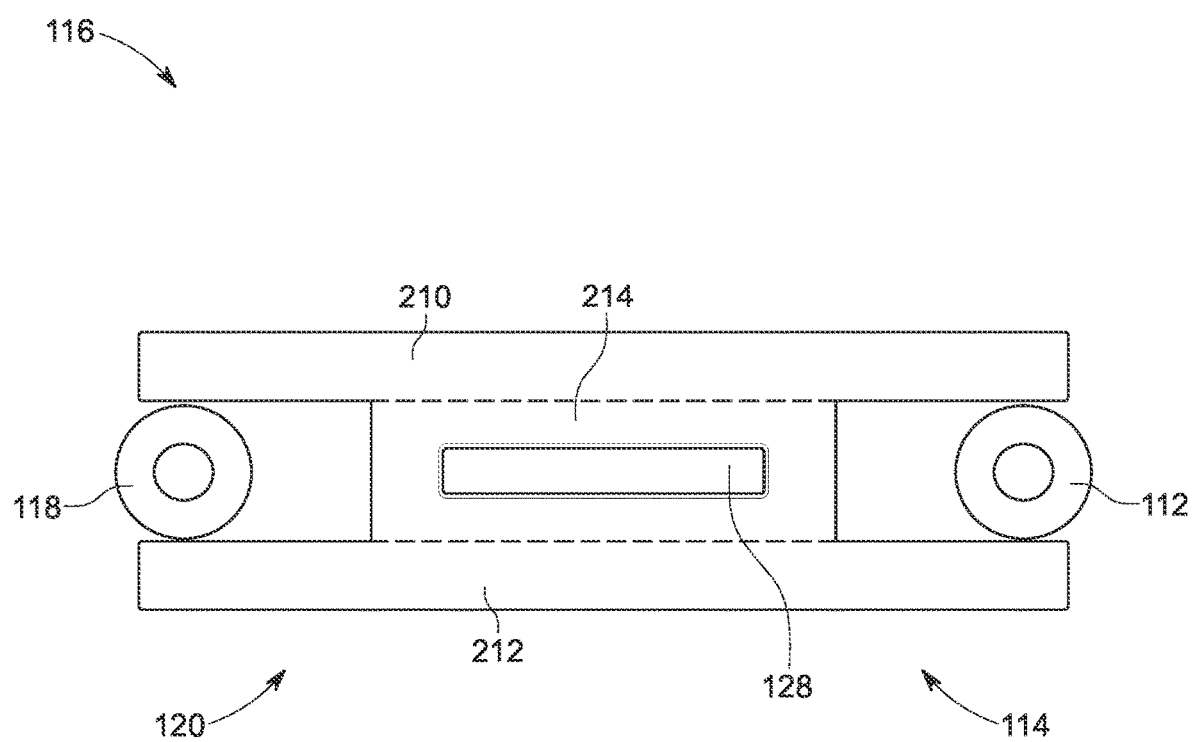
FIG. 2 is a front view of a bracket, according to some implementations.

FIG. 2 depicts a front view of the bracket 116, according to some implementations. The bracket 116 includes a top lateral arm 210, a bottom lateral arm 212, and a central plate 214. The central plate 214 extends between the top lateral arm 210 and the bottom lateral arm 212. The central plate 214 includes the base 128. The first bearing 112 pivots between the ends of the top lateral arm 210 and the bottom lateral arm 212 at the first end 114. The second bearing 118 pivots between the ends of the top lateral arm 210 and the bottom lateral arm 212 at the second end 120.

In some implementations, the top lateral arm 210, the bottom lateral arm 212, the central plate 214, and the base 128 form a single unit. For example, these components can be cast from a single material formed in a mold, 3D-printed as a single unit, or machined from a single piece of material. In other implementations, the components of the bracket 116 are assembled and attached to each other. For example, one or more of these components can be attached by screws, bolts, nuts, pins, welding, adhesives, a rail and groove, crimping, a snap fit, rivets, a compression fit, or a combination of these.

The top lateral arm 210, the bottom lateral arm 212, and the central plate 214 are generally configured as an H-shaped bracket. Although the top lateral arm 210 and the bottom lateral arm 212 have equal dimensions as depicted, in other implementations the top lateral arm 210 can have different dimensions than the bottom lateral arm 212. Also, the central plate 214 can include one or more plates extending between the top lateral arm 210 and the bottom lateral 212. The top lateral arm 210, the bottom lateral arm 212, and the central plate 214 can also include surface features, such as a curved surface, or indentations, grooves, or divots. Such features, for example, can enhance the strength of the bracket 116 while reducing the amount of material used in construction. Such features can thereby decrease the weight of the bracket 116.

Figure 3:
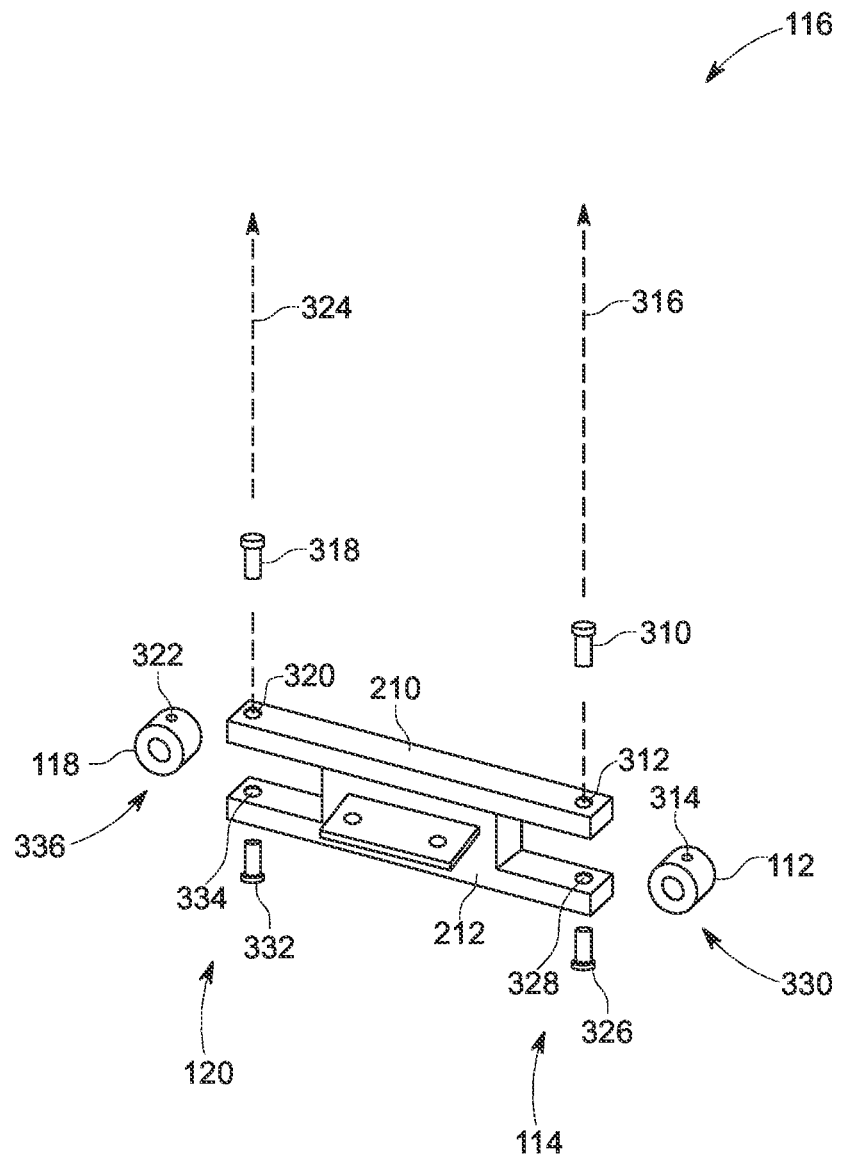
FIG. 3 is a perspective view of the bracket, according to some implementations.

FIG. 3 shows a perspective view of the bracket 116 according to some implementations. The bracket 116 includes a first pin 310, a first hole 312 passing through the first end 114 of the top lateral arm 210, and a second hole 314 passing into the first bearing 112. The first bearing 112 is coupled to the first end 114 of the bracket 116 by positioning the first pin 310 through the first hole 312, and into the second hole 314. The first pin 310, the first hole 312, and the second hole 314 are aligned along a first axis 316 that is parallel to the pole axis 130 (FIG. 1), when the flexible mount 10 is attached to the pole 18.

The bracket 116 also includes a second pin 318, a third hole 320 passing through the second end 120 of the top lateral arm 210, and a fourth hole 322 passing into the second bearing 118. The second bearing 118 is coupled to the second end 120 of the bracket 116 by positioning the second pin 318 through the third hole 320 and into the fourth hole 322. The second pin 318, the third hole 320, and the fourth hole 322 are aligned along a second axis 324 that is parallel to the first axis 316.

In some implementations, the bracket 116 further includes a third pin 326, a fifth hole 328 passing through the first end 114 of the bottom lateral arm 212, and a sixth hole 330 passing into the first bearing 112. The fifth hole 328 is opposite to the first hole 312 in the first end 114. The sixth hole 330 is opposite to the second hole 314 in the first bearing 112. The first bearing 112 is coupled to the first end 114 by positioning the third pin 326 through the fifth hole 328 and into the sixth hole 330. The third pin 326, the fifth hole 328, and the sixth hole 330 are aligned along the first axis 316.

In some implementations, the bracket 116 further includes a fourth pin 332, a seventh hole 334 passing through the second end 120 of the bottom lateral arm 212, and an eighth hole 336 passing into the second bearing 118. The seventh hole 334 is opposite to the third hole 320 in the second end 120. The eighth hole 336 is opposite to the fourth hole 322 in the second bearing 118. The second bearing 118 is coupled to the second end 120 by positioning the fourth pin 332 through the seventh hole 334 and into the eighth hole 336. The fourth pin, the seventh hole 334, and the eight hole 336 are aligned along the second axis 324.

The first pin 310, and optionally the third pin 326, allows for rotation or pivoting of the first bearing 112 at the first end 114. In some implementations, the rotation includes a 360-degree arc around the first axis 316. In some implementations, the allowable rotation includes a smaller arc, such as at least a 10-degree arc, 30-degree-arc, 45-degree arc, 90-degree arc, or a 180-degree arc. In some implementations, the rotation is at least about a 180-degree arc.

Similarly, the second pin 318, and optionally the fourth pin 332, allows for rotation or pivoting of the second bearing 118 at the second end 120. In some implementations, the rotation includes a 360-degree arc around the second axis 324. In some implementations, the allowable rotation includes a smaller arc, such as at least a 10-degree arc, a 30-degree arc, a 45-degree arc, a 90-degree arc, or a 180-degree arc. In some implementations, the rotation is at least about a 180-degree arc.

Figure 4:
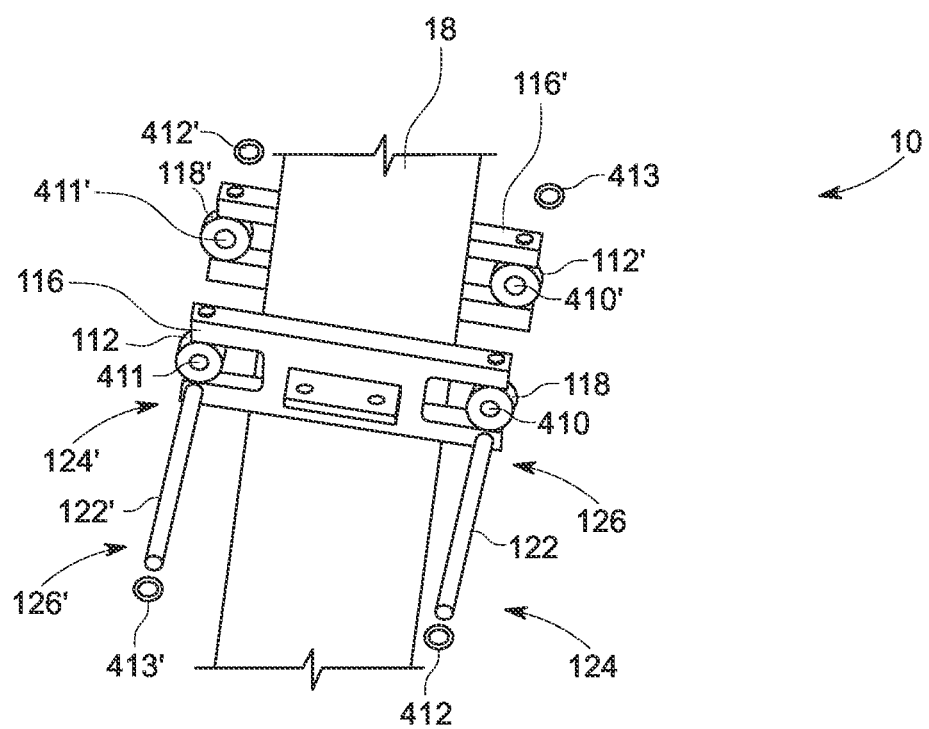
FIG. 4 is a perspective view of two brackets and two tensioners secured to a pole, according to some implementations.

FIG. 4 depicts the flexible mount 10 in an unassembled form around a pole 18. In this implementation, the flexible mount 10 includes two brackets 116 and 116', and two tensioners 122 and 122'. The tensioner 122 is coupled to the second bearing 118 by positioning the tensioner 122 through a bearing hole 410 in the second bearing 118. The tensioner 122 is coupled to the bracket 116' by positioning the tensioner 122 through a bearing hole 410' in a first bearing 112' of the bracket 116'. The tensioner 122 includes a first adjustable stop 412, and a second adjustable stop 413. The first adjustable stop 412 can be positioned at the first end 124 of the tensioner 122. The second adjustable stop 413 can be positioned at the second end 126 of the tensioner 122. The tensioner 122' is coupled to the first bearing 112 by positioning the tensioner 122' through a bearing hole 411 in the first bearing 112. The tensioner 122' is coupled to the bracket 116' by positioning the tensioner 122' through the bearing hole 411' in a second bearing 118' of bracket 116'. The tensioner 122' includes a first adjustable stop 412' and a second adjustable stop 413'. The first adjustable stop 412' can be positioned at a first end 124' of the tensioner 122'. The second adjustable stop 413' can be positioned at a second end 126' of the tensioner 122'.

Figure 5:
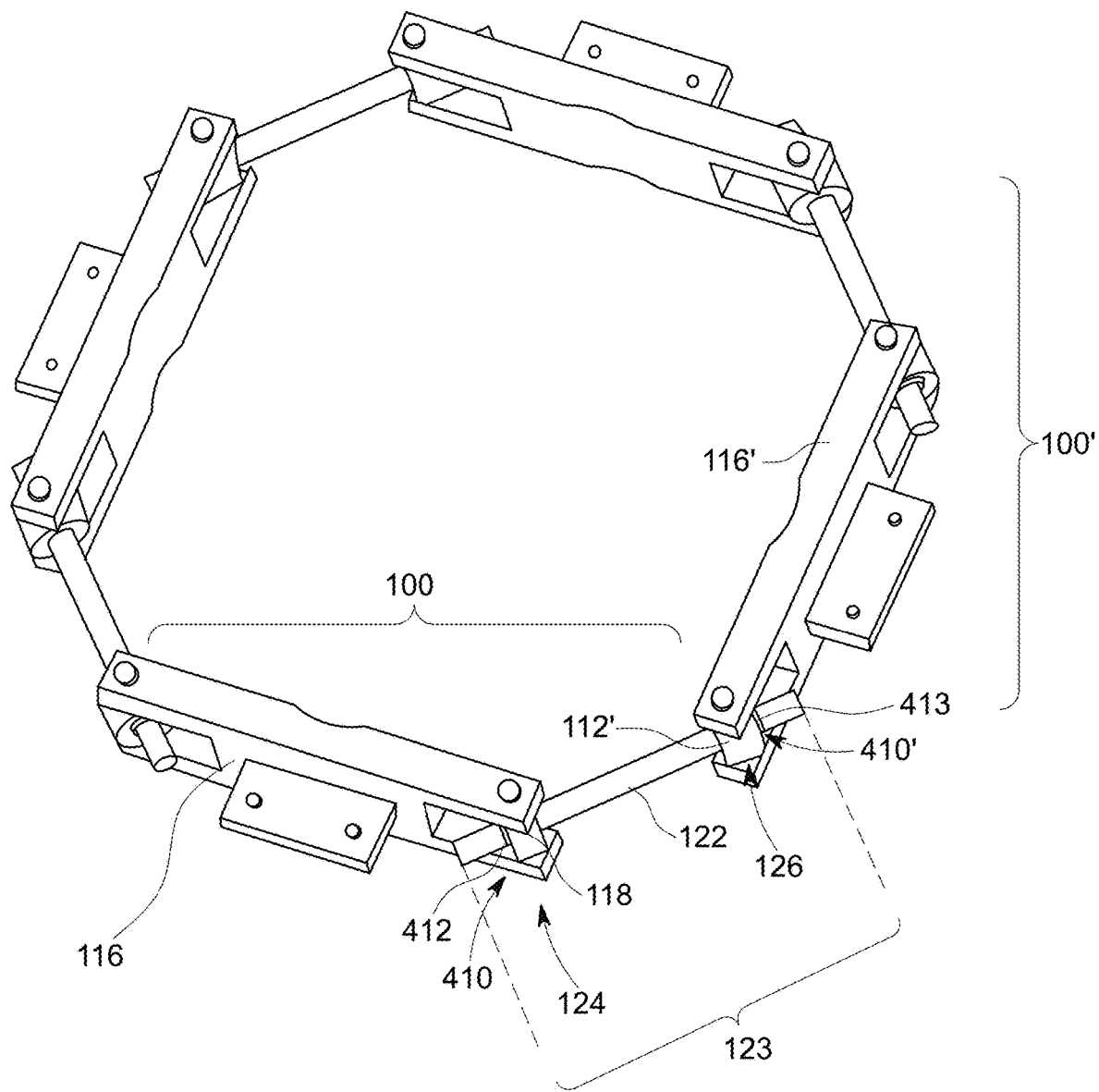
FIG. 5 depicts a detailed perspective view of two brackets coupled by a tensioner, according to some implementations.

FIG. 5 depicts a detailed view of the support 100 coupled to the sequential support 100', according to some implementations. The two brackets 116, 116' are coupled by the tensioner 122. The first end 124 of the tensioner 122 is inserted in the bearing hole 410 of the second bearing 118. The second end 126 of the tensioner 122 is inserted into the bearing hole 410' of the first bearing 112'.

In addition to the first adjustable stop 412 at the first end 124, the tensioner 122 includes the second adjustable stop 413 at the second end 126. The first adjustable stop 412 and the second adjustable stop 413 are adjustable along a length 123 of the tensioner 122. The distance between supports 100 and 100' can be changed by changing the position of the first adjustable stop 412 and the second adjustable stop 413. For example, moving the adjustable stops 412 and 413 closer together forces the bearings 118 and 112' closer together, which moves the supports 100 and 100' closer together.

In some implementations, the adjustable stops 412, 413 cannot be removed from the first end 124 or the second end 126 of the tensioner 122 once they are adjusted into position. In some other implementations, the adjustable stops 412, 413 can be removed from the first end 124 or the second end 126 of the tensioner 122. In the implementations where the adjustable stops 412, 413 are removable, the tensioner 122 is removably coupled to the bearings 112' and 118.

In some implementations, the first adjustable stop 412 is a first nut, and the first end 124 of the tensioner 122 is threaded to accept the first nut. In some implementations, the second adjustable stop 413 is a second nut, and the second end 126 of the tensioner 122 is threaded to accept the second nut.

Figure 6A:
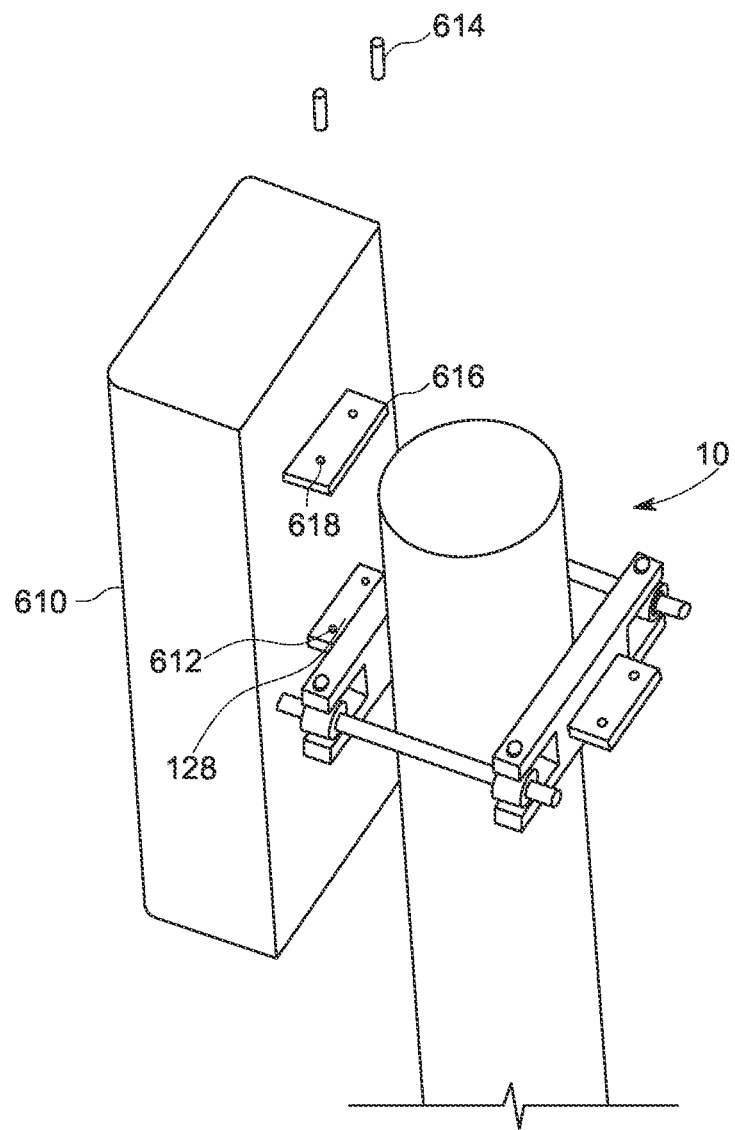
FIG. 6A is a perspective view illustrating how an object is attached to a flexible mount, according to some implementations.

FIG. 6A illustrates how an object 610 is attached to the flexible mount 10, according to some implementations. In some implementations, the object 610 is a communications equipment component including, but not limited to, an antenna, a satellite dish, an AAU, an AIR, a RRH, RRU, a DU or a CU.

The base 128 includes holes 612 and a fastener 614. For example, the fastener can be a screw, a pin or a bolt. The object 610 includes a matching base 616 having holes 618. To attach the object 610 to the flexible mount 10, the holes 612 are aligned with the holes 618 and the fasteners 614 are inserted in the holes 612, 618. According to some implementations, the object 610 can be attached to base 128 by other fasteners. For example, a fastener can include a bolt, a nut, a screw, a pin, a clamp, a rail, a groove, a hook, a loop, a cable, a rope, or combinations of these.

Although the base 128 is depicted as a shelf in FIG. 6A, any base shape or device can be used. In some implementations, the base 128 is configured as a coupling element as described above directly on the central plate 214 (FIG. 2). For example, a bolt, a nut, a screw, a pin, a clamp, a rail, a groove, a hook, a cable, a rope, or combinations of these may be directly attached to the central plate 214.

Figure 6B:
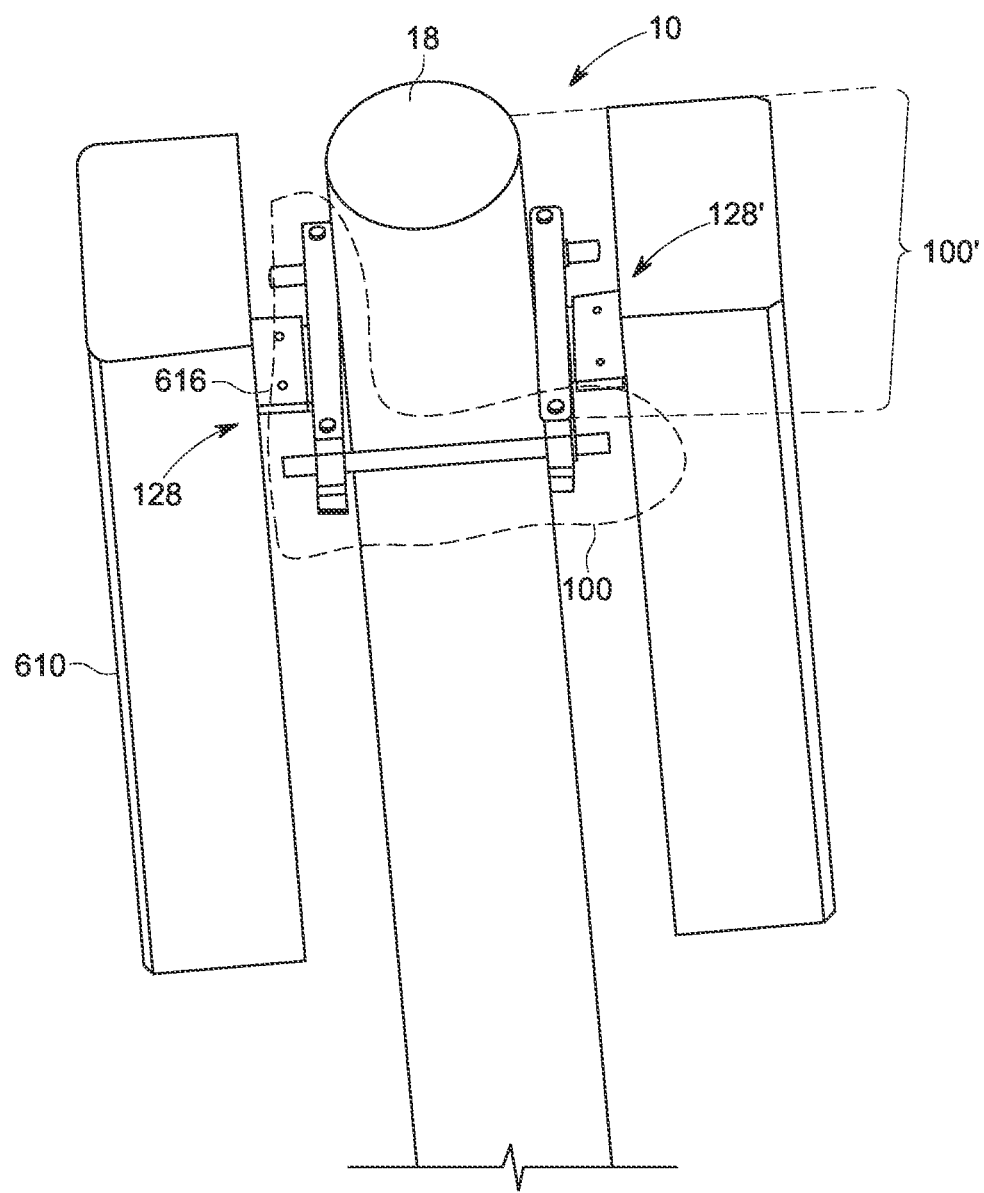
FIG. 6B is a perspective view showing the object, shown in FIG. 6A, attached to the flexible mount, according to some implementations.

FIG. 6B shows the object 610 attached to the flexible mount 10 using the base 128 and matching base 616. In this implementation, two supports 100, 100' are used. In other implementations, three or more supports 100 can be used, for example if the pole 18 has a larger diameter. In some implementations, more supports 100 are used as is required by the diameter of the pole.

In some implementations, more than one object is attached to a single flexible mount 10. For example, a second object can be attached to the base 128' on the support 100', and opposite from the mounted object 610. In some implementations, the base 128, 128' of the supports 100, 100' can also accommodate more than one object. Accordingly, in such implementations, the number of objects 610 that can be attached to a flexible mount 10 is equal to or more than the number of supports 100 in the flexible mount 10. For example, for the implementation depicted by FIG. 1, at least four objects can be mounted on the flexible mount 10; while for the implementation depicted by FIG. 6B at least two objects can be mounted on the flexible mount 10.

Although the flexible mount 10 can be used for communications equipment and tall outdoor structures, the flexible mount can also be used in any environment and for any object 610 that needs to be suspended, indoors or outdoors, to a pole 18 or a similar structure. For example, the flexible mount 10 can be used for attachment of lights, cameras, a monitor, or speakers. In some implementations, the flexible mount 10 is used for attachment of electrical equipment such as a transformer or a battery. In some implementations, the flexible mount 10 can be used for attachment of sampling equipment, such as environmental sampling equipment to monitor air quality. In some implementations, the flexible mount 10 can also be used for attachment of objects 610 to a buoy in a body of water, to underwater structures, or to a tree trunk or branch. The flexible mount 10 can be used for attachment of objects 610 to a vehicle, such as to a car, train, ship, space ship, a submarine, a satellite, or a weather balloon, provided these are equipped with a pole 18 or similar feature.

Figure 7:
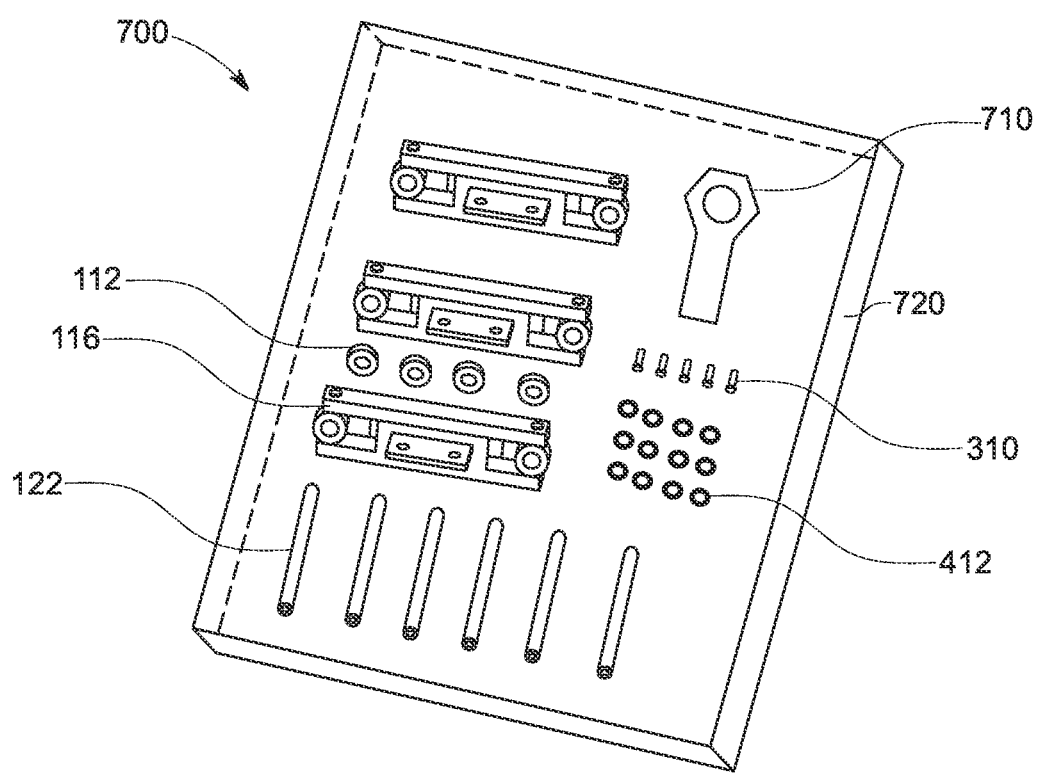
FIG. 7 is a perspective view illustrating a kit for a flexible mount, according to some implementations.

In some implementations, components of the flexible mount 10 are included in a kit 700 as depicted in FIG. 7. The kit can include one or more the components of the flexible mount 10. For example, the kit 700 can include the bracket 116 and the tensioner 122. In some implementations, the kit 700 can include components of the bracket 116 such as the bearing 112 and the pin 310. In some implementations, the kit 700 includes the stops 412. In some implementations, the kit 700 can also include tool 710. For example, tool 710 can be configured for manipulating and attaching the flexible mount 10 to the pole 18, or for attaching the object 610 to the base 128 (FIG. 6B). In some implementations, the kit 700 can include tool 710 for general repair, such as for inserting pin 310 into the bracket 116. In some implementations, the tool 710 includes one or more of a wrench, an adjustable wrench, a socket wrench, a hex key, pliers, a screw driver, a drill, a tap, a hammer, a level, a saw, a file, sand paper, or a powered version of these. The kit 700 can also include general lubricants, unlocking lubricants, and an anti-rust coating. The kit 700 can also include instructions for assembly of the flexible mount 10. In some implementations, the kit 700 includes a carrier or case 720 for holding the components of the flexible mount 10 and optionally the tools 710. For example, the carrier can include internal straps and cutouts for securing and placing the components and the optional tools. Thus, the components of the kit 700 can be used to assemble, modify or repair the flexible mount 10 to accommodate any number of objects and any diameter of pole.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A flexible mount comprising:
   a series of two or more supports, the series of two or more supports configured to securely hold a pole, wherein each support includes:
   a bracket including a first end, a second end, and a base for mounting an object radially relative to a longitudinal axis of the pole;
   a first bearing pivotally coupled to the first end of the bracket;
   a second bearing pivotally coupled to the second end of the bracket; and
   a tensioner including a first end coupled to the second bearing, and a second end coupled to a sequential support in the series.

2. The flexible mount of claim 1, wherein the bracket further comprises:
   a top lateral arm;
   a bottom lateral arm;
   a central plate including the base and extending between the lateral arms, wherein;
   the first bearing pivots between the top and bottom lateral arms at the first end; and
   the second bearing pivots between the top and bottom lateral arms at the second end.

3. The flexible mount of claim 2 further comprising:
   a first pin;
   a first hole passing through a first end of the top lateral arm; and
   a second hole passing into the first bearing, wherein;
   the first pin is positioned in the first hole and the second hole; and
   the first pin, the first hole, and the second hole are aligned along a first axis parallel to the longitudinal axis; and
   a second pin;
   a third hole passing through a second end of the top lateral arm; and
   a fourth hole passing into the second bearing, wherein;
   the second pin is positioned in the third hole and the fourth hole; and
   the second pin, the third hole, and the fourth hole are aligned along a second axis parallel to the longitudinal axis.

4. The flexible mount of claim 3 further comprising:
   a third pin;
   a fifth hole passing through a first end of the bottom lateral arm; and
   a sixth hole passing into the first bearing, wherein;
   the third pin is positioned in the fifth hole and the sixth hole; and
   the third pin, the fifth hole, and the sixth hole are aligned along the first axis; and
   a fourth pin;
   a seventh hole passing through a second end of the bottom lateral arm; and
   an eighth hole passing into the second bearing, wherein;
   the fourth pin is positioned in the seventh hole and the eighth hole; and
   the fourth pin, the seventh hole, and the eighth hole are aligned along the second axis.

5. The flexible mount of claim 1, wherein the first end of the tensioner is removably coupled to the second bearing.

6. The flexible mount of claim 1, wherein the second end of the tensioner is removably coupled to the sequential support in the series.

7. The flexible mount of claim 1, wherein:
   the first bearing and the second bearing each include a bearing hole;
   the first end of the tensioner is inserted into the bearing hole of the second bearing; and the second end of the tensioner is inserted into the bearing hole of the first bearing of the sequential support.

8. The flexible mount of claim 7, wherein:
the tensioner includes a first adjustable stop on the first end and a second adjustable stop on the second end; and
the first adjustable stop and the second adjustable stop are adjustable to a plurality of positions along a length of the tensioner to increase or decrease the distance between the sequential supports in the series.

9. The flexible mount of claim 8, wherein:
the first adjustable stop is a first nut, and the second adjustable stop is a second nut; and
the first end of the tensioner is threaded to accept the first nut, and the second end of the tensioner is threaded to accept the second nut.

10. The flexible mount of claim 1, wherein the base includes a fastener for mounting the object.

11. The flexible mount of claim 10, wherein the fastener includes one of: a bolt, a nut, a screw, a pin, a clamp, a rail, a groove, a hook, a loop, a cable, a rope, or a combination thereof.

12. The flexible mount of claim 1, wherein the object is one of: an Active Antenna Unit (AAU), an Antenna-Integrated Radio (AIR), a Remote Radio Head (RRH), a Remote Radio Unit (RRU), a Distributed Unit (DU), and a Centralized Unit (CU).

13. A kit for a flexible mount comprising:
a bracket having a base;
a first bearing including a first bearing hole, the first bearing pivotally coupled to a first end of the bracket;
a second bearing including a second bearing hole, the second bearing pivotally coupled to a second end of the bracket; and
a tensioner having a diameter matching the first bearing hole and the second bearing hole, and a stop configured to be adjustable along a length of the tensioner.

14. The kit of claim 13 further comprising a case for holding the bracket and the tensioner.

15. The kit of claim 13 further comprising a tool configured to adjust and position the stop to a plurality of positions along the length of the tensioner.

16. The kit of claim 13 further comprising, one or more additional brackets and one or more additional tensioners.

17. The kit of claim 13, wherein a first end of the tensioner is coupled to the second bearing of the bracket, the tensioner and bracket forming a support.

* * * * *